United States Patent
Duhault et al.

[19]

[11] Patent Number: 6,118,493
[45] Date of Patent: Sep. 12, 2000

[54] METHOD AND APPARATUS FOR SELECTING A CHANNEL FROM A MULTIPLE CHANNEL DISPLAY

[75] Inventors: James Duhault, Etobicoke; Angela Neill, Toronto; Lance Edward McIntosh, Oakville, all of Canada

[73] Assignee: ATI Technologies, Inc., Thornhill, Canada

[21] Appl. No.: 08/831,292

[22] Filed: Apr. 1, 1997

[51] Int. Cl.[7] .................................................. H04N 5/445
[52] U.S. Cl. .......................................... 348/564; 348/563
[58] Field of Search .................................. 348/563, 564, 348/565, 731, 734, 906, 7, 12, 13; 345/127, 342, 145, 146, 157, 327, 158, 507, 522, 508, 115; H04N 5/44, 5/445, 7/16, 7/173

[56] References Cited

U.S. PATENT DOCUMENTS

| | | | |
|---|---|---|---|
| 4,257,043 | 3/1981 | Tsuchiko | 340/722 |
| 4,984,082 | 1/1991 | Okamura | 348/565 |
| 5,031,046 | 7/1991 | Bruggemann | 358/194.1 |
| 5,144,438 | 9/1992 | Kim | 348/565 |
| 5,194,954 | 3/1993 | Duffield | 348/565 |
| 5,237,418 | 8/1993 | Kaneko | 348/738 |
| 5,414,471 | 5/1995 | Saitoh et al. | 348/565 |
| 5,537,152 | 7/1996 | Ishikawa | 348/564 |
| 5,585,821 | 12/1996 | Ishikura et al. | 345/145 |
| 5,635,954 | 6/1997 | Yamada | 345/157 |
| 5,642,498 | 6/1997 | Kutner | 395/509 |

FOREIGN PATENT DOCUMENTS

| | | | |
|---|---|---|---|
| 8-098102 | 4/1996 | Japan | H04N 5/45 |

*Primary Examiner*—Chris Grant
*Attorney, Agent, or Firm*—Markison & Reckamp, PC

[57] ABSTRACT

A method and apparatus that allows a user to preview live audio and/or video of a channel displayed in a multiple channel selection display prior to making a complete selection is generally accomplished by providing pixel information for displaying visual representations of a plurality of channels where the video representation of each channel is displayed in a corresponding channel display area (i.e., a video thumbnail). When the user selects one of the video representations in a preview mode, the video thumbnail is switched from a still image with no audio to an image that includes live audio and/or video. This preview mode remains until the user deselects the preview mode, selects full display area viewing, or a time-out period expires. In addition to the preview option, the user is provided with an editing option that allows the user to customize his or her multiple channel display.

18 Claims, 6 Drawing Sheets

METHOD AND APPARATUS FOR SELECTING A CHANNEL FROM A MULTIPLE CHANNEL DISPLAY

FIELD OF THE INVENTION

The present invention relates generally to computers and more particularly to selecting a channel from a plurality of channels displayed on a computer, where the channels may be, but are not limited to, television broadcast channels, cable broadcast channels, or satellite broadcast channels.

BACKGROUND OF THE INVENTION

Computers are arguably one of the greatest technical accomplishments of mankind. They provide man with an ever increasing source of information, data manipulation capabilities, convenience, and entertainment. Computer entertainment has many forms, including computer games, interactive multimedia presentations, and, more recently, broadcast television.

To receive a television broadcast, a computer needs to be equipped with a tuner.

Depending on the type of tuner employed, the computer may receive traditional radio frequency (RF) broadcast television channels, cable broadcast channels, or satellite broadcast channels. In addition, the tuner may be able to receive radio broadcasts. By adjusting the tuner, a channel is selected and subsequently processed and displayed on the computer screen, monitor, or provided to a television.

Due to the processing power of a computer, the computer can provide a wide variety of services that a regular television cannot. For example, if the television broadcast has associated closed caption, the computer can record the closed caption data, along with video images of the broadcast, and store it as a word document. In addition, the computer can sample many television channels and provide a fixed number of these samples on the computer screen at one time. Such multiple channel display may be used to select which channel to view. When the selection is made, the channel selected fills the computer screen.

While the multiple channel display allows the user to select which channel to view, it does not, however, allow the user to preview a selection before it fills the computer screen. As such, if the user does not want to view the selected channel, s/he must reinitiate the fixed multi-channel display. Further, because the number of channels is fixed, the user is not allowed to customize the number of channels viewed, or which channels to include in the multi-channel display.

Therefore, a need exists for a computer system that allows a computer user to preview a channel in a multi-channel display and to customize the display to meet his/her personal needs.

DETAILED DESCRIPTION OF THE DRAWINGS

Generally, the present invention provides a method and apparatus that allows a user to preview live audio and/or video of a channel displayed in a multiple channel selection display prior to making a full screen selection. This is generally accomplished by providing pixel information for displaying visual representations of a plurality of channels where the video representation of each channel is displayed in a corresponding channel display area (i.e., a video thumbnail). When the user selects one of the video representations in a preview mode, the video thumbnail is switched from a still image with no audio to an image that includes live audio and/or video. This preview mode remains until the user deselects the preview mode, selects full display area viewing, or a time-out period expires. In addition to the preview option, the user is provided with an editing option that allows the user to customize his or her multiple channel display. With such a method and apparatus, a user is provided with the flexibility of previewing live video and/or live audio of a channel before selecting it for full display area viewing. In addition, the user is provided with editing options to further customize his or her viewing preferences.

Figure 1:
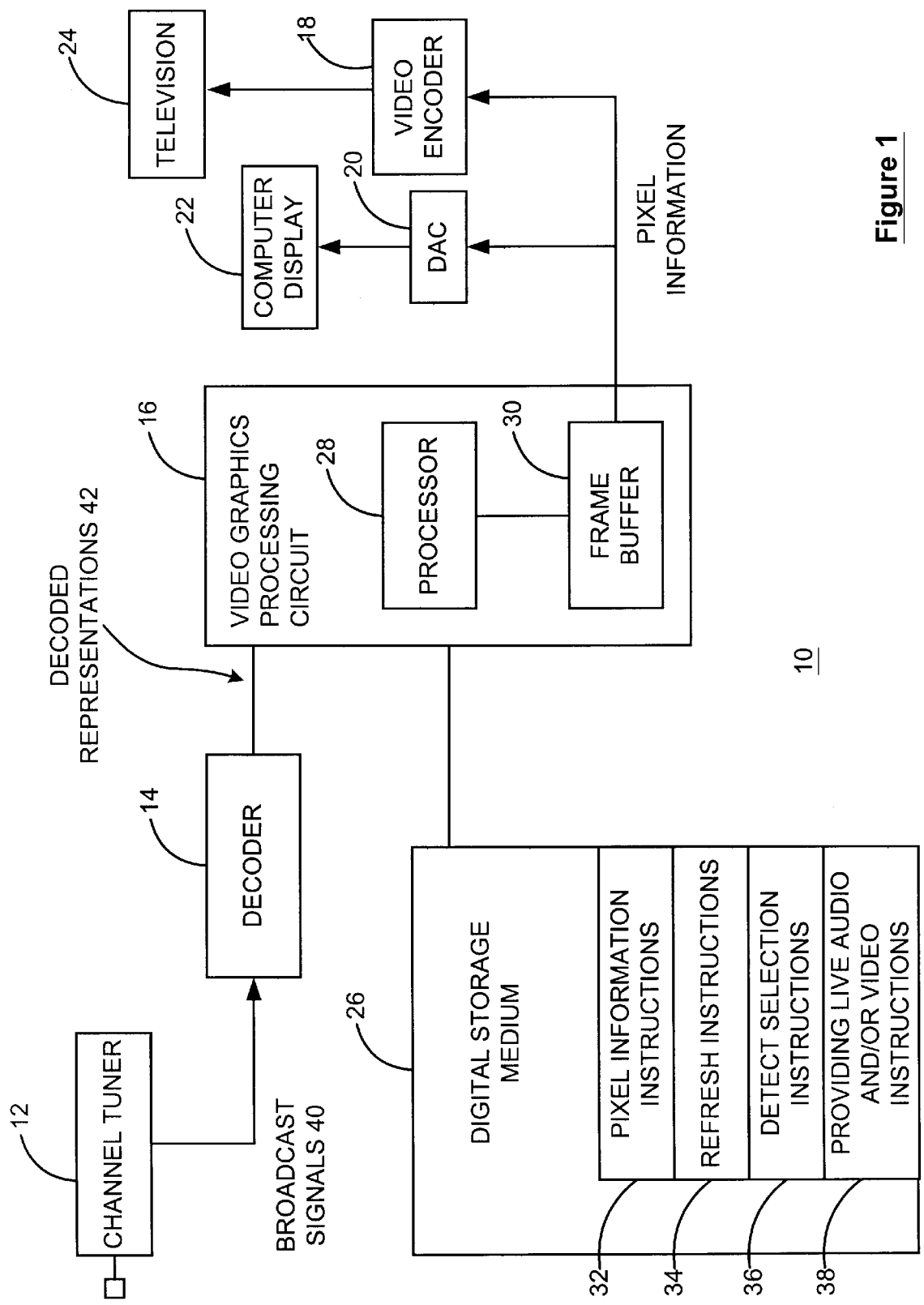
FIG. 1 illustrates a schematic block diagram of a multi-channel display which is in accordance with the present invention.

The present invention can be more fully described with reference to FIGS. 1–6. FIG. 1 illustrates a schematic block diagram of a multi-channel display 10 which includes a channel tuner 12, a decoder 14, a video graphics processing circuit 16, a video encoder 18, a digital to analog converter (DAC) 20, and a digital storage medium 26. The DAC 20 provides analog representations of pixel information 44 to a computer display 22, while the video encoder 18 provides encoded representations of the pixel information 44 to a television.

The video graphics circuit 16 includes a processor 28 and a frame buffer 30. The frame buffer 30 may be RAM that stores the pixel information 44 in two read/write stages. The first read/write stage is in a read mode as it supplies the pixel information to the DAC 20 and the video encoder 18, while the second stage is in a write mode as it is storing new pixel information from the processor 28. The processor 28, which may be a microprocessor, a microcontroller, a digital signal processor (DSP), minicomputer, any device that manipulates digital information based on programming instructions, or any combination thereof, processing data based on operational instructions stored within a video graphics memory (not shown), the computer's system memory (not shown), and/or the digital storage medium 26.

The digital storage medium 26, which may be RAM, ROM, EPROM, EEPROM, or any device that stores digital information, stores programming instructions that, when read by the processor 28, causes the processor 28 to implement the channel preview selection from a multi-channel display. In particular, the digital storage medium 26 stores programming instructions which cause the processor 28 to provide pixel information for displaying visual representations of a plurality of channels within a plurality of corresponding channel display areas 32; refresh the visual representations of the plurality of channels on a periodic basis 34; detect selection of a visual representation of one of the plurality of channels 36; and provide at least one of live audio and live video of the one of the plurality of channels within a corresponding one of the plurality of corresponding channel display areas 38.

In operation, the channel tuner 12 provides broadcast signals 40 to the decoder 14. Depending on the type of tuner 12, the broadcast signals 40 may be audio and/or video signals of broadcast television channels, cable television channels, satellite television channels, multi-cast mode broadcasts, or broadcast radio channels with accompanying graphical identifiers such as radio data services which indicates the radio station's name, station format (Eg. music or talk), and the type of music it plays. In the multiple channel display mode, the tuner 12 is constantly changed, or returned, to retrieve samples of live broadcasts of the various channels to be displayed. These live broadcast samples are sent to the decoder 14 as broadcast signals 40.

The decoder 14, which may be a Brooktree BT 848 decoder, decodes the broadcast signals and provides the decoded representations 42 to the video graphics circuit 16. The video graphics circuit 16, which may be RAGE PRO from ATI Technologies, receives the decoded representations and converts them into pixel information 44 based on the programming instructions stored in the digital storage medium 26 and subsequently produces the display as shown in FIG. 2, which may be displayed on the television 24 or the computer monitor 22.

Figure 2:
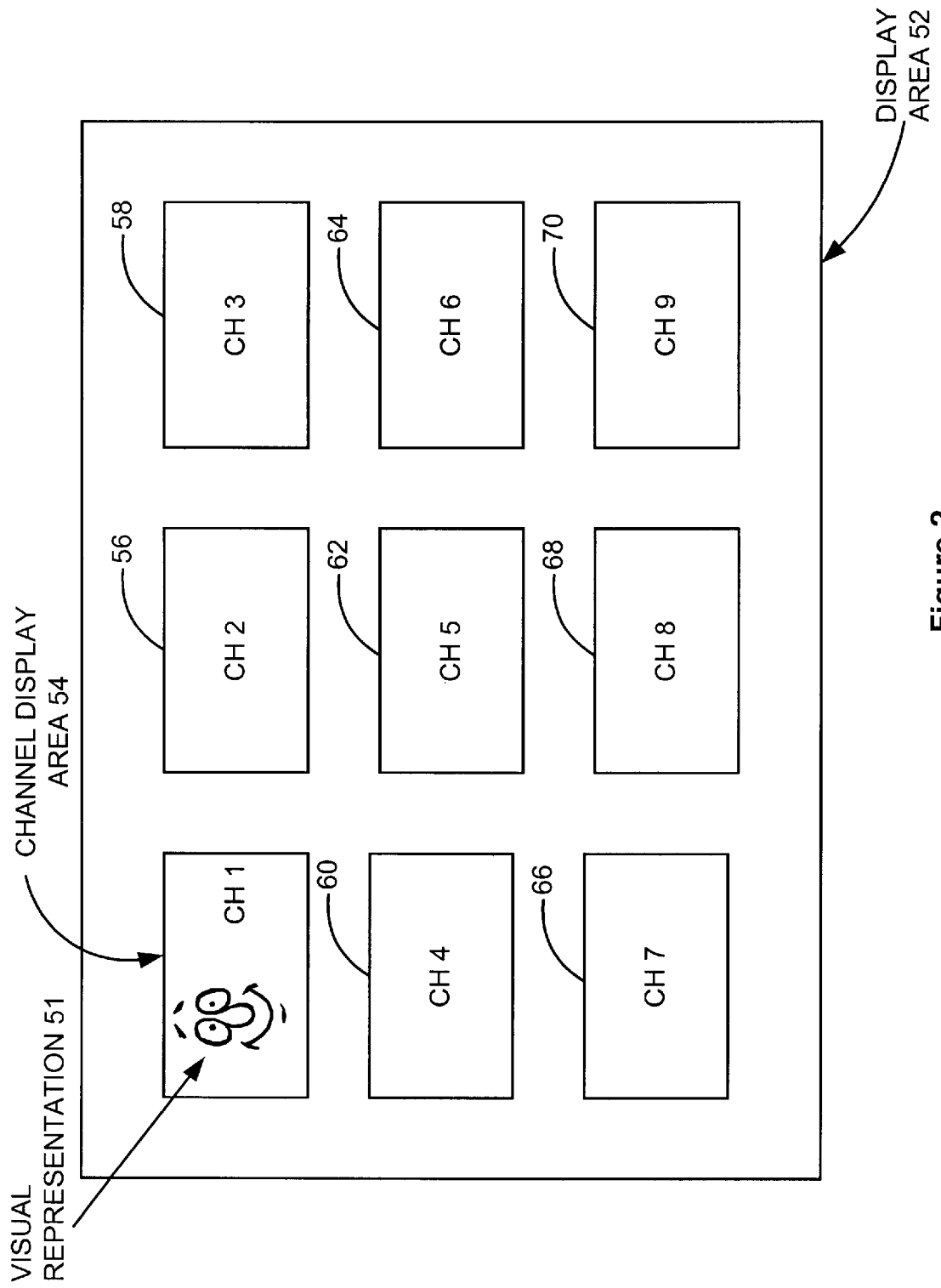
FIG. 2 illustrates a block diagram of a display area that includes a plurality of channel display areas which is in accordance with the present invention.

FIG. 2 illustrates a block diagram of a display area 52 that includes a plurality of channel display areas 54, 56, 58, 60, 62, 64, 66, 68, and 70. In each of these channel display areas a visual representation 51 of the sampled channel broadcasts received by the tuner is displayed. The size of the channel display area, which is often called a thumbnail, depends on the size of the display area 52 and the number of channels to be displayed. The present method calculates the maximum size of each thumbnail based on the size of the display area 52, the number of channels to be displayed, and displaying characteristics such as aspect ratio and minimum resolvable image size.

The multiple channel display of FIG. 2 will remain until the user selects one of the channels for full display area viewing, selects an editing function, a preview function, or terminates the multiple channel display. While in the multiple channel display, each of the visual representations 51 will be updated or refreshed at a periodic rate. The periodic rate is primarily a function of the speed of the tuner 12 in switching from channel to channel and the number of channels.

Figure 3:
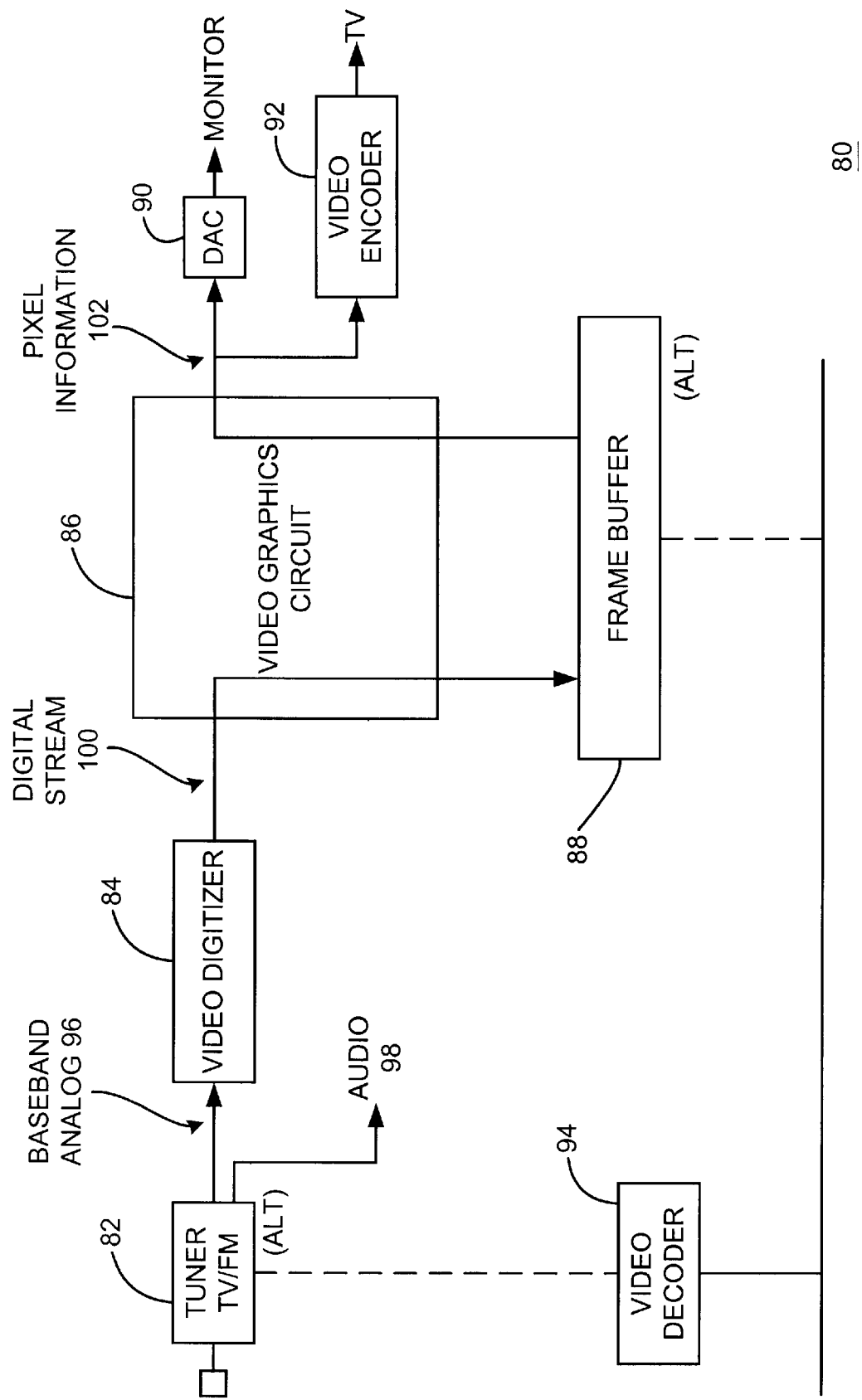
FIG. 3 illustrates a schematic block diagram of an alternate multi-channel display which is in accordance with the present invention.

FIG. 3 illustrates a schematic block diagram of an alternate multi-channel display 80 which includes a TV/FM tuner 82, a video graphics circuit 86, a frame buffer 88, a DAC 90, a video encoder 92, and a video digitizer 84 or a video decoder 94. This circuit operates very similarly to the one of FIG. 1, but includes an alternate coupling of the tuner to the video graphics circuit 86. In a first alternative, the analog video images 96 received by the tuner 82 are provided to the video digitizer 84, which may be a Brooktree BT 829 digitizer, which digitizes the images and provides a digital stream 100 to the video graphics circuit 86 over a dedicated bus. The video graphics circuit 86 processes the digital stream 100 as discussed above. The audio signals 98 received by the tuner 82 are provided to an audio processor (not shown) for processing.

In the second alternative, the signals received by the tuner 82 are provided to the video decoder 94, which may be a BT 848 decoder. The decoded signals are then provided to the system bus for routing to the frame buffer 88. In this circuit, the system bus is the system bus of a computer system operably coupled to the central processing unit, the system memory, and other peripherals of the computer system. When full video is being processed, the video decoder 94 is providing up to 25 Mbps of data to the frame buffer 88, which is a primary reason why the first alternative is a preferred coupling technique. Regardless of which path the data is received by the video graphics circuit 86, it provides pixel information 102 to the DAC 90 and the video encoder 92.

Figure 4:
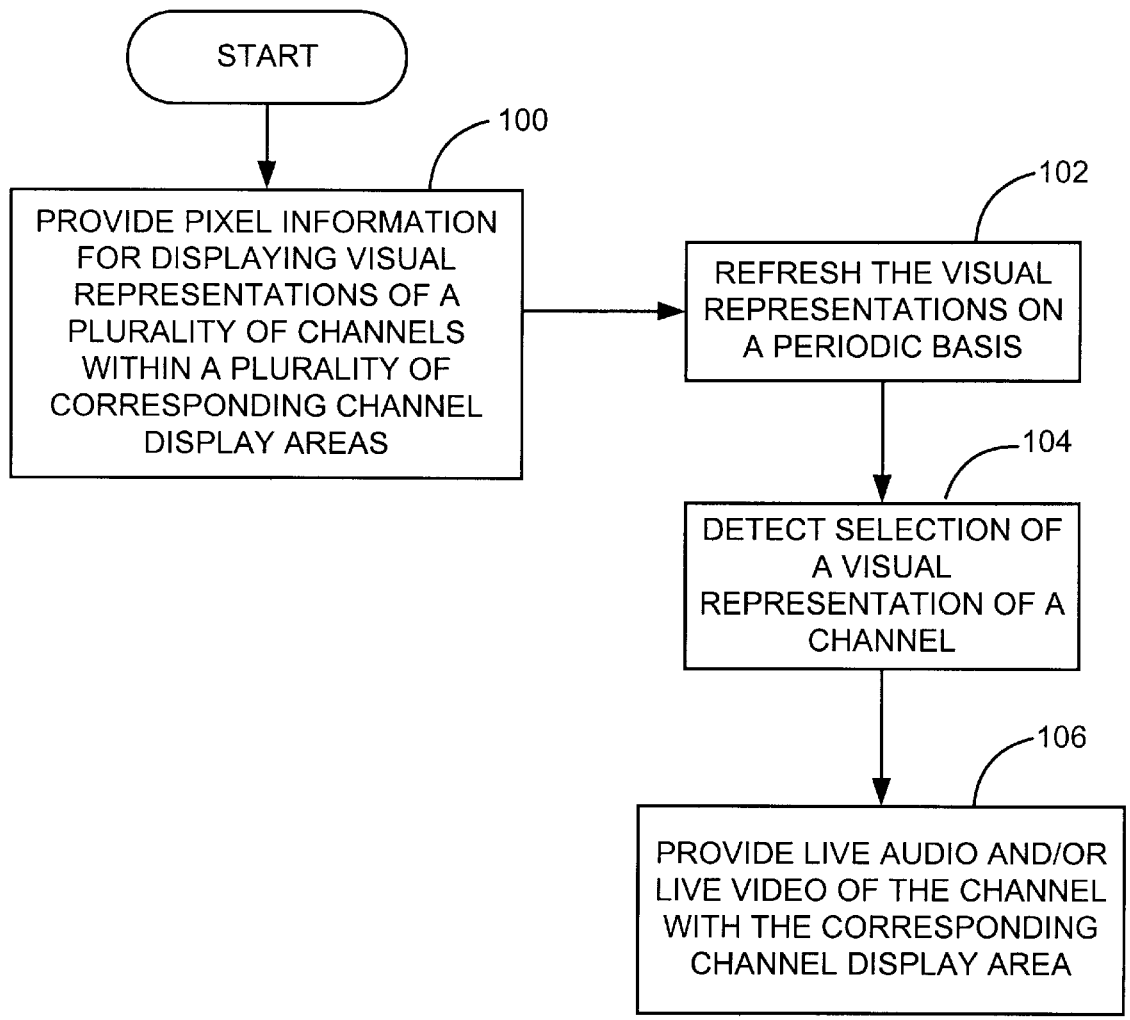
FIG. 4 illustrates a logic diagram that may be used to implement a multi-channel display preview selection method in accordance with the present invention.

FIG. 4 illustrates a logic diagram that may be used to implement the preview selection from the multi-channel display. The process begins at step 100, where pixel information is provided to display the visual representations of the plurality of channels. Each visual representation is displayed in a corresponding one of a plurality of channel display areas (i.e., video thumbnails). The process then proceeds to step 102, where the visual representations are refreshed on a periodic basis. In essence, refreshing the visual representations is creating new pixel information from more recently sampled video images by the tuner. The periodic rate, while it may be user controlled to be at any rate, is generally dictated by how fast the tuner can sample the plurality of channels.

The process then proceeds to step 104, where a preview selection of one of the channels is detected. Such preview selection may be done by a single click of a mouse button when the cursor is positioned over the video representation of the channel, or done in any other graphical user interface or keyboard interface manner. With the channel in the preview mode, the process proceeds to step 106, where live video and/or audio is provided for the preview selected channel within the corresponding channel display area. In other words, the multiple channel display is still present, but the selected channel is displaying live audio and/or video within its video thumbnail.

Figure 5:
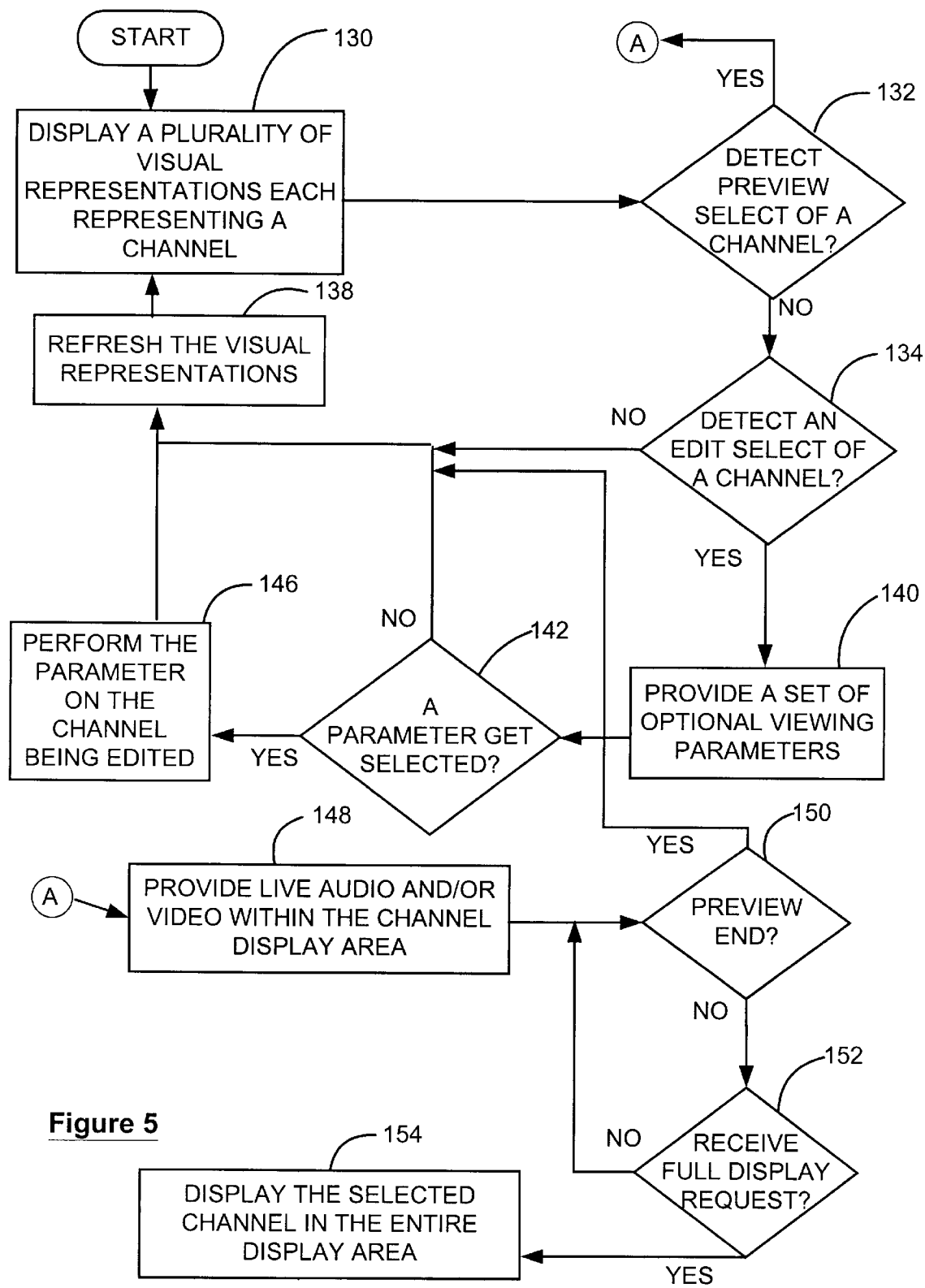
FIG. 5 illustrates a logic diagram that may be used to implement an alternate multi-channel display preview selection and edit method which is in accordance with the present invention.

FIG. 5 illustrates a logic diagram that may be used to implement an alternate multi-channel display. The process begins at step 130, where a plurality of channels are scaled to fit within a given display area. Such scaling is done as described above with reference to FIG. 4. With the plurality of thumbnails displayed, the process of FIG. 5 proceeds to step 132, where a determination is made as to whether a preview selection of one of the channels has been received. A preview selection may be done in a variety of ways. For example, it may be done using a mouse, a point and click cursor, a highlight cursor about the thumbnail, a keyboard entry or any other graphical or keyboard user interface technique.

If a preview selection was not detected, the process proceeds to step 134 where a determination is made as to whether an edit selection has been received. Like the preview selection, the edit selection can be done in a variety of ways, such as a right button click on a mouse, a keyboard entry, etc. If an edit selection is not detected, the process proceeds to step 138, where the visual representations of the plurality of channels are refreshed. While the refresh, or update, rate can be set by the user, it is typically dependent upon the hardware and the number of channels being sampled as discussed above with reference to FIG. 1. While the visual representations are being refreshed and displayed, the process continues to monitor for a preview selection or an edit selection.

When an edit selection is detected, the process proceeds to step 140, where a set of optional viewing parameters are provided. The optional viewing parameters, which include, but are not limited to, add/delete from the automatic generated channel list, delete from the user's customized channel list, add/delete to a lock-out list (Eg. parental control), or labeling a channel with a name, icon, text, etc. The process then proceeds to step 142, where a determination is made as to whether a parameter has been selected. If a parameter was not detected, which may be determined by a time-out period or a user directive, the process returns to refreshing the visual representations and waiting for a preview select or an edit select. If, however, a parameter was selected, the process proceeds to step 146, where the selected parameter is executed upon the selected thumbnail. Once completed, the process returns to step 138.

When a preview selection is detected, the process proceeds to step 148, where live audio and/or live video is provided for the selected thumbnail, but is done so within the channel display area. The process then proceeds to step 150, where a determination is made as to whether the preview has ended. Note that the preview may end by a directive from the user or a time out period expiring. If the previewing ends, the process returns to step 138. If, however, the previewing has not ended, the process proceeds to step 152, where a determination is made as to whether a full display area viewing option has been selected. If not, the process continues to provide the live audio and/or live video until the preview ends or full display area viewing is selected. When full display area viewing is selected, the process proceeds to step 154, where the selected channel is displayed in the entire display area.

Figure 6:
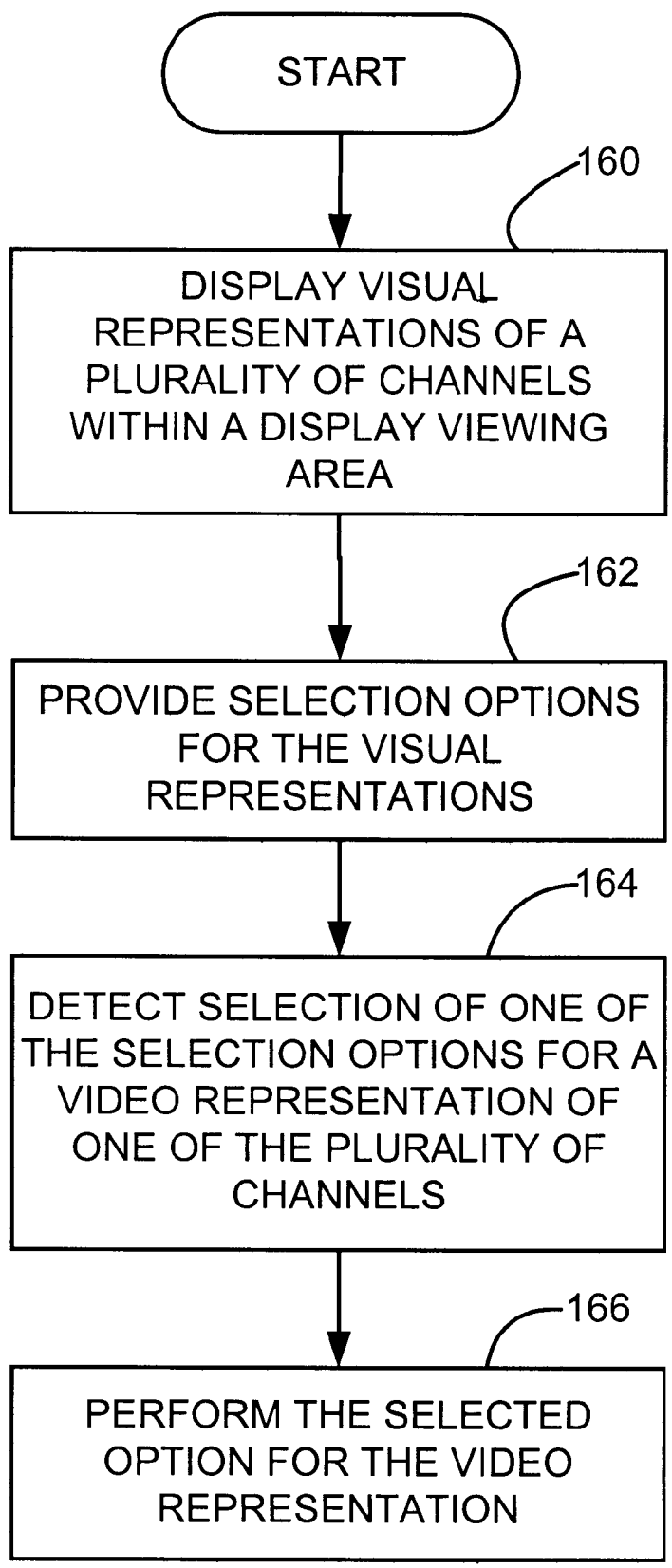
FIG. 6 illustrates a logic diagram that may be used to implement another alternate multi-channel display preview selection method in accordance with the present invention.

FIG. 6 illustrates a logic diagram that may be used to implement another alternate preview selection in a multi-channel display. The process begins at step 160, where the visual representations of a plurality of channels are displayed within a display viewing area. The process then proceeds to step 162, where selection options are provided for the visual representations. Such selection options include live preview of audio and/or video, full display area viewing, or editing. The process proceeds to step 164, where selection of one of the selection options is detected for a video representation for one of the plurality of channels. The process then proceeds to step 166, where the selected option is performed for the video representation.

The preceding discussion has described a method and apparatus for providing computer users with the ability to customize viewing of a plurality of broadcast channels. This is generally accomplished by allowing the user to preview live audio and/or video in the channel display area, i.e., thumbnail size, of the plurality of channels before making a full display area viewing option. In addition, users are now provided with the ability to customize the list of channels being displayed in a multiple channel display format.

We claim:

1. A method for selecting a channel from a multiple channel display, the method comprising the steps of:
  a) periodically tuning, by a tuner, to each live broadcast of a plurality of live broadcasts to retrieve a still image of the live broadcast;
  b) providing pixel information for displaying the still image of each of the plurality of live broadcasts in a corresponding one of a plurality of channel display areas;
  c) refreshing the still images on a periodic basis by periodically retuning the tuner to each live broadcast of the plurality of live broadcasts to retrieve another still image of the live broadcast;
  d) detecting selection of one of the still images of the plurality of live broadcasts to produce a selected live broadcast; and
  e) providing at least one of live audio and live video of the selected live broadcast within the corresponding one of the plurality of channel display areas.

2. The method of claim 1 further comprises, within step (d), detecting a cursor movement on to the still image of the one of the plurality of channels and detecting cursor selection of the still image.

3. The method of claim 1 further comprises, within step (d), detecting a highlighted cursor being positioned about the still image of the one of the plurality of channels and detection cursor selection of the still image.

4. The method of claim 1 further comprises, within step (e), providing the at least one of the live audio and the live video for a predetermined duration, a user defined duration, or until a termination signal is received.

5. The method of claim 4 further comprises suspending refreshing of the still images when the at least one of the live audio and the live video are being provided.

6. The method of claim 5 further comprises, when the predetermined duration or the user defined duration ends or the termination signal is received, returning to refreshing the still images of the plurality of channels.

7. The method of claim 5 further comprises, prior to the predetermined duration or the user defined duration ending or receiving the termination signal, selecting the one of the still images for full display area viewing.

8. The method of claim 1 further comprises, within step (b), providing pixel information for displaying the still images of television broadcast channels as the plurality of channels, wherein the television broadcast channels are received by at least one of: an antenna, a cable receiver, a satellite dish, or a multi-cast mode receiver.

9. The method of claim 1 further comprises, within step (b), providing pixel information for displaying the still image of radio broadcast channels, which include channel identifiers.

10. The method of claim 1 further comprises:
  detecting an editing selection of one of the plurality of channel display areas;
  providing a set of optional viewing parameters;
  detecting selection of a parameter of the set of optional viewing parameters; and
  performing the parameter upon the still image displayed in the one of the plurality of channel display areas.

11. The method of claim 10 further comprises selecting one of:
  an add/delete a live broadcast from a channel list that identifies the plurality of live broadcasts,
  delete the one of the plurality of channel display areas from the plurality of channel display areas,
  add/delete to a lock-out list, and
  labeling the one of the plurality of channel display areas.

12. The method of claim 1 further comprises, within step (c), determining the display area to be one of: full screen or a window.

13. The method of claim 1 further comprises, within step (b), establishing the plurality of live broadcasts by one of: automatic scanning of receivable channels and receiving channel selections from a user.

14. A digital storage medium that stores programming instructions that, when read by a processor, causes the processor to select a channel from a multiple channel display, the digital storage medium comprising:

first means for storing programming instructions that, when read by the processor, causes the processor to provide pixel information for displaying visual representations of a plurality of channels within a plurality of corresponding channel display areas wherein the visual representations include at least one still image of each of the channels that was retrieved by a tuner that periodically tunes to each of the plurality of channels to retrieve the at least one still image;

second means for storing programming instructions that, when read by the processor, causes the processor to refresh the visual representations of the plurality of channels on a periodic basis by causing the tuner to periodically retune to each of the plurality of channels to retrieve at least another still image;

third means for storing programming instructions that, when read by the processor, causes the processor to detect selection of a visual representation of one of the plurality of channels; and fourth means for storing programming instructions that, when read by the processor, causes the processor to provide at least one of live audio and live video of the one of the plurality of channels within a corresponding one of the plurality of channel display areas.

15. A multiple channel display comprising:

a channel tuner operable to periodically tune to a plurality of channels to produce a plurality of broadcast signals;

a decoder operably coupled to receive the plurality of broadcast signals and to convert the plurality of broadcast signals into a plurality of decoded representations;

a video graphics processing circuit operably coupled to the decoder, wherein the video graphics processing circuit generates pixel information from the plurality of decoded representations;

a digital storage medium that stores programming instructions that, when read by a processor within the video graphics processing circuit, causes the processor to select a channel from a multiple channel display, the digital storage medium comprising:

first means for storing programming instructions that, when read by the processor, causes the processor to provide pixel information for displaying visual representations of the plurality of channels within a plurality of corresponding channel display areas, wherein the visual representations include at least one still image of each of the channels that is derived from a corresponding one of the plurality of decoded representations;

second means for storing programming instructions that, when read by the processor, causes the processor to refresh the visual representations of the plurality of channels on a periodic basis by causing the channel tuner to periodically retune to each of the plurality of channels to retrieve broadcasts signals such that at least another still image is produced for each of the plurality of channels;

third means for storing programming instructions that, when read by the processor, causes the processor to detect selection of a visual representation of one of the plurality of channels; and fourth means for storing programming instructions that, when read by the processor, causes the processor to provide at least one of live audio and live video of the one of the plurality of channels within a corresponding one of the plurality of corresponding channel display areas.

16. A method for selecting channel preview options for a plurality of channels, the method comprising the steps of:

a) displaying visual representations of a plurality of channels within a display viewing area, wherein the visual representations include at least one still image of each of the plurality of channels that was retrieved by a tuner that periodically tunes to each of the plurality of channels to retrieve the at least one still image;

b) providing selection options for the visual representations of the plurality of channels, wherein the selection options include at least one of: live preview of audio, live preview of video in the display viewing area, live preview of audio and video in the display viewing area, full display area viewing in the display viewing area, and edit in the display viewing area;

c) detecting selection of one of the selection options for a video representation of one of the plurality of channels; and d) performing, in the display viewing area, the one of the selection options for the video representation of the one of the plurality of channels.

17. The method of claim 16 further comprises, when the one of the selection options is either the live preview of audio, the live preview of video, or the live preview of audio and video, detecting the full display area viewing option.

18. A digital storage medium that stores programming instructions which, when read by a processor, causes the processor to select channel preview options for video representations of a plurality of channels, the digital storage medium comprises:

first storage means for storing programming instructions that, when read by the processor, causes the processor to display visual representations of a plurality of channels within a display viewing area, wherein the visual representations include at least one still image of each of the plurality of channels that was retrieved by a tuner that periodically tunes to each of the plurality of channels to retrieve the at least one still image;

second storage means for storing programming instructions that, when read by the processor, causes the processor to provide selection options for the visual representations of the plurality of channels, wherein the selection options include at least one of: live preview of audio, live preview of video in the display viewing area, live preview of audio and video in the display viewing area, full display area viewing in the display viewing area, and edit in the display viewing area;

third storage means for storing programming instructions that, when read by the processor, causes the processor to detect selection of one of the selection options for a video representation of one of the plurality of channels; and fourth storage means for storing programming instructions that, when read by the processor, causes the processor to perform, in the display viewing area, the one of the selection options for the video representation of the one of the plurality of channels.

* * * * *